United States Patent [19]

Inoue

[11] Patent Number: 4,828,236

[45] Date of Patent: May 9, 1989

[54] DAMPER DEVICE FOR A DOOR HAVING DUAL-DIRECTION OPERATING BIASING SPRING MEANS

[75] Inventor: Yasuhiko Inoue, Yokohama, Japan

[73] Assignee: Nifco, Inc., Yokohama, Japan

[21] Appl. No.: 149,302

[22] Filed: Jan. 28, 1988

[30] Foreign Application Priority Data

Feb. 4, 1987 [JP] Japan ............................ 62-15202[U]

[51] Int. Cl.[4] ............................................ F16F 1/00

[52] U.S. Cl. ...................................... 267/182; 49/386; 188/290; 188/382; 220/334; 267/221; 267/136; 312/319; 16/49; 16/72; 16/81; 16/DIG. 10

[58] Field of Search ..................................... 16/51-62, 16/65, 70, 80, 75, 76, 77, DIG. 9, DIG. 10, 49, 81, 72; 49/386, 379, 371, 364, 394, 333; 220/246, 260, 264, 334-344; 188/322.5, 290, 382, 294; 267/217, 221, 154-155, 136, 182; 292/DIG. 12, 6, DIG. 4; 312/319

[56] References Cited

U.S. PATENT DOCUMENTS

| | | | |
|---|---|---|---|
| 2,828,505 | 4/1958 | Hutzelman | 16/80 |
| 3,548,443 | 12/1970 | Rassa | 16/57 X |
| 3,579,709 | 5/1971 | Pierie | 16/80 X |
| 3,828,393 | 8/1974 | Pierie | 16/72 X |
| 3,840,936 | 10/1974 | Sato | 16/76 X |
| 4,067,084 | 1/1978 | Tillmann | 16/51 X |
| 4,069,545 | 1/1978 | Holet et al. | 16/72 X |
| 4,141,104 | 2/1979 | Watson | 16/80 X |
| 4,325,164 | 4/1982 | Sasaki | 16/52 X |
| 4,348,786 | 9/1982 | Hirose | 16/75 |
| 4,457,047 | 7/1984 | Lautenschläger | 16/72 X |
| 4,470,220 | 9/1984 | Sudo | 49/386 X |
| 4,565,266 | 1/1986 | Omata | 188/290 X |
| 4,601,446 | 7/1986 | Opsahl | 49/386 X |
| 4,602,828 | 7/1986 | Omata | 312/319 |
| 4,616,861 | 10/1986 | Kurosaki | 292/6 |
| 4,657,291 | 4/1987 | Kurosaki | 292/DIG. 4 X |
| 4,660,250 | 4/1987 | Tillman et al. | 16/58 |
| 4,662,111 | 5/1987 | Romberg | 49/386 X |
| 4,688,695 | 8/1987 | Hirohata | 49/364 X |
| 4,709,445 | 12/1987 | Waldo et al. | 16/76 X |

*Primary Examiner*—Douglas C. Butler
*Attorney, Agent, or Firm*—Schwartz & Weinrieb

[57] ABSTRACT

A damper device comprises damping structure and a spring device and is advantageously used for a door swingably supported by a shaft to be opened and shut between a totally shut position and a totally opened position and opened under the influence of its own weight at least from a position intermediate of the aforementioned two positions to the totally opened state. The damper element acts against the motion of the door. The spring element biases the door in the shutting direction at least from the intermediate position to the totally opened position.

15 Claims, 3 Drawing Sheets

DAMPER DEVICE FOR A DOOR HAVING DUAL-DIRECTION OPERATING BIASING SPRING MEANS

BACKGROUND OF THE INVENTION

1. Field of the Invention

This invention relates to a damper device for smoothly opening or shutting a door, a lid or the like used in household electrical appliances, a dashboard glove compartment, or the like.

2. Description of the Prior Art

Heretofore, doors or lids, which will hereinafter simply be referred to as doors, of household electrical appliances, vehicle glove compartments, various kinds of furniture, and the like, have used a damper device in which a rack is provided upon the door and a pinion is provided upon the appliance so as to mesh with the rack. The pinion is provided with a damper utilizing the viscous property of an oil in order to generate a resisting force against the pivotal motion of the door. The opening speed of the door is thus controlled so as to provide smooth opening thereof and to protect the door hinges as well as the door itself from the adverse effects of any shock forces. At the same time, the person who opens the door experiences a better "feel" from the operation, as disclosed, for example, within U.S. Pat. No. 4,565,266.

However, in such a conventional damper device, since the resisting force of the damper is comparatively weak, it is designed so that the speed of rotation of the pinion is increased in order to increase the resisting force against the motion of the door. In this case, the rack itself inevitably becomes bulky and, in addition, one end of the rack must be secured near a free end of the door. Therefore, the opening and shutting operation of the door may encounter interference. Furthermore, the above-mentioned structure is inconvenient as regards the movement of articles into and out of the compartment closed by means of the door. Moreover, since the pinion is rotated at a comparatively high rate of speed, its service life tends to be shortened. While use of a damper having a large capacity might be considered, such a damper is bulky and leads to increased unit fabrication costs.

OBJECT OF THE INVENTION

The object of the present invention is to provide a door damper which is small in size and excellent in durability.

SUMMARY OF THE INVENTION

To achieve the above-mentioned object, a damper device constructed according to the present invention for use with a door which is opened and shut between a totally shut position and a totally opened position as a result of pivotal movement about a horizontal axis and which is opened by means of its own weight at least from a position intermediate the aforementioned two positions to the totally opened position, comprises damping means operative against the motion of the door, and spring means for biasing the door in the shutting direction at least from the intermediate position to the totally opened position.

In this way, by using spring means instead of a pinion and a comparatively large rack, the damper device can be made small in size and the service life thereof can be prolonged.

BRIEF DESCRIPTION OF THE DRAWINGS

The above and other objects and features of the invention will become more apparent from the following detailed description with reference to the accompanying drawings, wherein.

DETAILED DESCRIPTION OF THE PREFERRED EMBODIMENT

Figure 1:
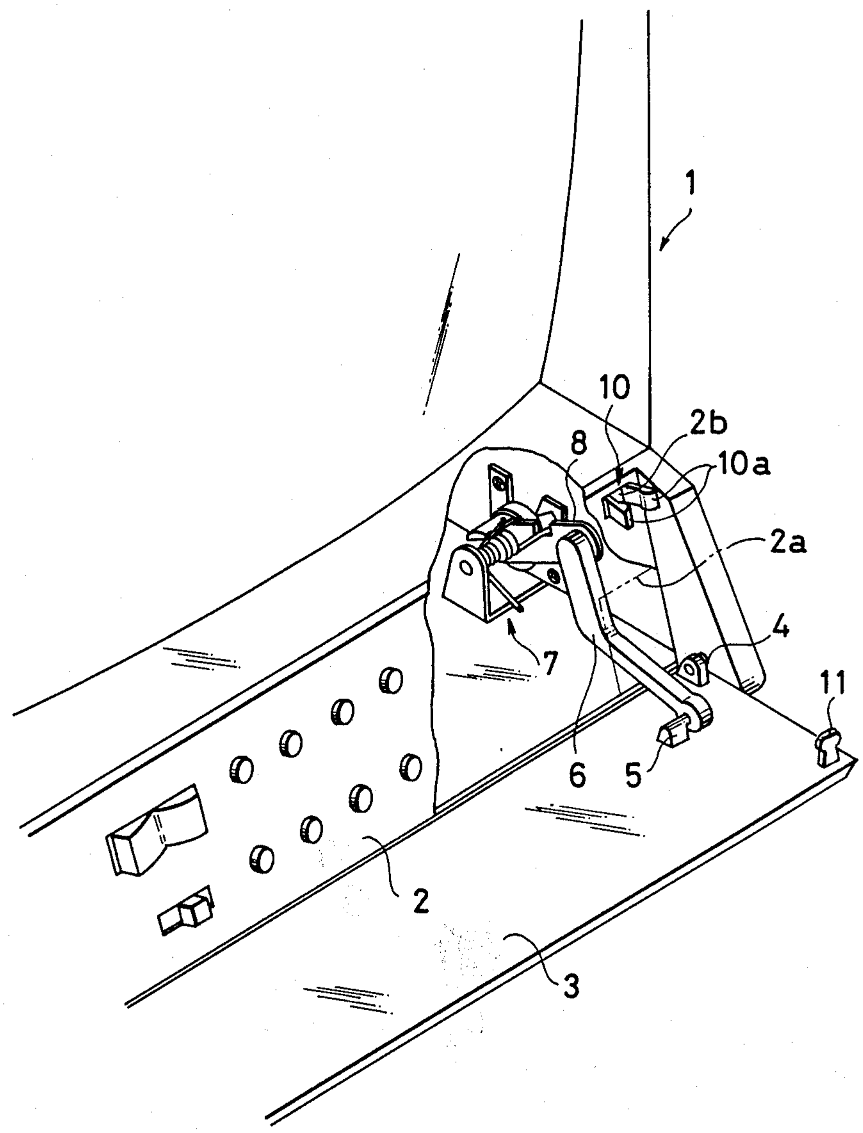
FIG. 1 is a perspective view showing one embodiment of a damper device according to the present invention in which the damper device is applied to a video apparatus.

FIG. 1 illustrates a damper device constructed according to the present invention and which is used in conjunction with a door 3 mounted upon an operating panel 2 of a video apparatus 1. The inner end of the door 3 is pivotably supported upon the operating panel 2 by means of a pair of pivot shafts 4 only one of which is shown. The door 3, when in its totally shut position, is slightly inclined backwardly with respect to a vertical plane. From that position, the door 3 can be moved to a totally opened horizontal position after passing through the vertical position. In this way, the front surface of the operating panel 2 is alternatively exposed and covered by means of the door 3. The door 3 is integrally provided upon the side end portion of a rear surface thereof with a retaining portion 5 so as to pivotably retain one end of a rod 6 projecting from an opening 2a defined within a lower part of the operating panel 2. The other end of the rod 6 is pivotably connected to an arm 8 of a damper device 7 which is provided for restricting the opening motion of the door 3 and which is located internally of the operating panel 2, so that the door 3 is smoothly opened according to the pivotal movement of the arm 8.

The door 3 is further provided with a wide headed engaging projection 11 projecting from a corner portion of the rear surface thereof so as to engage a corresponding pair of engaging pieces 10a of a stopper 10 which project outwardly from a recess 2b formed within an upper corner part of the operating panel 2 so as to retain the door 3 in a totally shut position. The stopper 10 has a heart shaped cam type retaining mechanism which alternately repeats a first action in which the engaging pieces 10a are caused to hold the engaging projection 11 when the engaging projection 11 is pushed inward and a second action in which the engaging projection 11 is disengaged from the engaging pieces 10a by pushing the engaging projection 11 is again pushed inwardly. As the heart shaped cam type retaining mechanism, a device as disclosed in, for example, U.S. Pat. Nos. 4,657,291 and 4,616,861 can be used.

Figure 2:
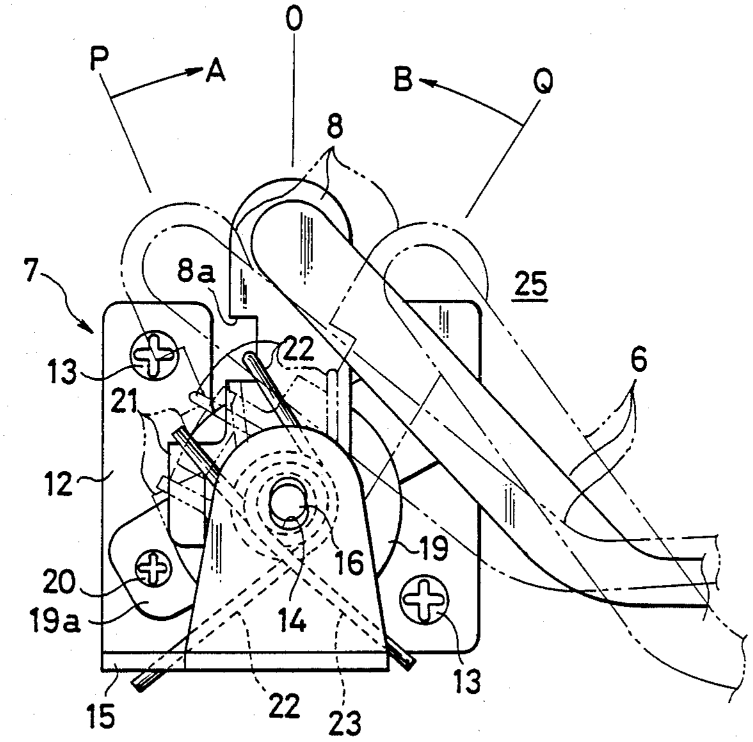
FIG. 2 is a side view of the damper device of FIG. 1.
Figure 3:
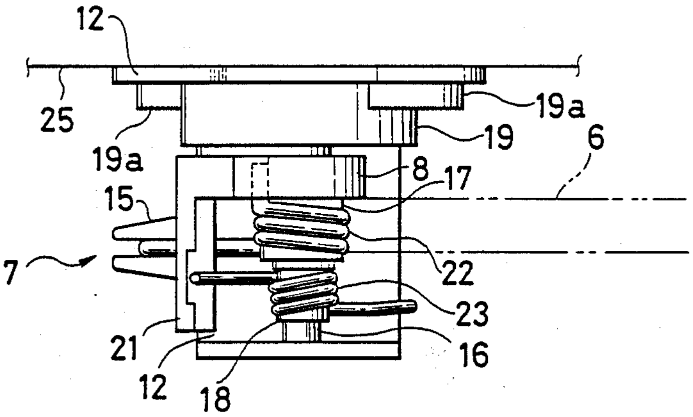
FIG. 3 is a plan view of the damper device of FIG. 1.

FIGS. 2 and 3 are enlarged views of the damper device of FIG. 1. In the figures, a casing 12 secured to a wall surface 24 of the panel 2 by means of bolts 13 is provided with a bearing 14. A disk-shaped oil damper 19 for restricting rotation of a rotary shaft 16 as will be described is secured to the casing 12 in such a manner as to face the bearing 14 by securing a tongue portion 19a to the casing 12 by means of a bolt 20. An input shaft of the oil damper 19 is integrally rotatably connected to one end of the rotary shaft 16, whereas the other end of the rotary shaft 16 is rotatably supported by means of the bearing 14.

Figure 5:
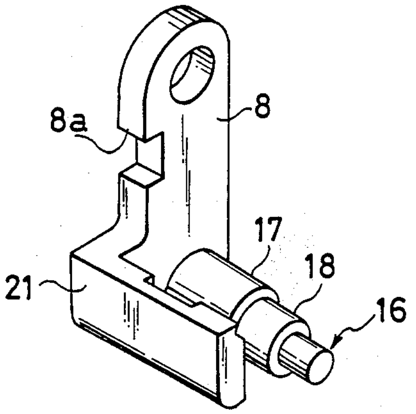
FIG. 5 is a perspective view of a rotary shaft of the damper device of FIG. 1.

The rotary shaft 16, as shown in FIG. 5, comprises a large diameter portion 17 disposed at the oil damper 19 side and a small diameter portion 18 extending from an intermediate portion to the bearing 14. The large diameter portion 17 is integrally provided with an arm 8 integrally rotatable with the rotary shaft 16, and a projecting piece 21 projecting from the arm 8 in the axial direction so as to engage one end of a torsion coil spring 23 as will be described. A free end of the arm 8 is pivotably connected to one end of the rod 6 as described.

Futhermore, the large diameter portion 17 of the rotary shaft 16 is provided with a torsion coil spring 22 wound therearound and adapted to bias the door 3 in the opening direction when the door 3 is positioned near the totally shut position. One end of the torsion coil spring 22 is retained upon the retaining portion 15 formed upon a lower part of the casing 12, whereas the other end thereof is retained within a cut-out portion 8*a* formed within an intermediate portion of the arm 8.

The small diameter portion 18 of the rotary shaft 16 is provided with another torsion coil spring 23 wound therearound and adapted to bias the door 3 in the closing direction when the door 3 is positioned near the totally opened position. One end of the second torsion coil spring 23 is abutted against the projecting piece 21 upon an upper surface thereof, whereas the other end thereof is abutted against the lower part of the casing 12 along a front edge portion thereof. A stepped-portion defined between the large diameter portion 17 and the small diameter portion 18 of the rotary shaft 16 is employed in order to correctly position the second torsion coil spring 23 so that the first and second torsion coil springs 22 and 23 do not interfere with each other. As is shown in FIG. 1, only a part of the rod 6 projects through the front surface of the operating panel 2 during actual operation and the damper device 7 is rearwardly of or internally within of the operating panel 2. Therefore, the operation of the operating panel 2 is not disturbed. Furthermore, the outer appearance of the operating panel 2 is not degraded.

With the above-mentioned constitution of the damper device, when the door 3 is in the totally shut position, the free end of the arm 8 is disposed at a position P as illustrated by the imaginary line in FIG. 2 and is biased, by means of the torsion coil spring 22, in the opening direction of the door 3, that is, the direction shown by the arrow "A". It will be noted that the arm 8 is not at all affected by means of the torsion coil spring 23 at this time. When the upper end portion, that is, the portion where the engaging projection 11 is provided, of the door 3 is pushed once in the shutting direction of the door 3 and then released, the engaging projection 11 is disengaged from the stopper 10. As a result, the door 3 is swung in the opening direction by means of the biasing force of the torsion coil spring 22 against the resistance of the oil damper 19. At this time, the arm 8 is biased by means of the torsion coil spring 22 until it comes to a position at which the door 3 is swung in the opening direction by under the influence of its own weight, that is, near the position O of FIG. 2, for example.

When the door 3 opens and passes the position O, the arm 8 is biased by means of the torsion coil spring 23 in the closing direction, that is, the direction shown by the arrow "B". It will be noted here that the range within which the biasing force of the torsion coil spring 22 in the opening direction is effective, does not exceed the position O and only the biasing force of the torsion coil spring 23 acts upon the arm 8 after this position. And, the force for swinging the door 3 in the opening direction by under the influence of its own weight becomes maximum in the totally opened position of the door 3 of FIG. 1, that is, near the position Q of the arm 8 of FIG. 2. However, since the damper 19 always acts upon the door 3 so that the swinging movement of the door 3 is damped and since the biasing force of the torsion coil spring 22 in the opening direction is increased, the door 3 does not collide into other members which would ordinarily produce a banging sound and smoothly opens to its full extent.

Figure 4:
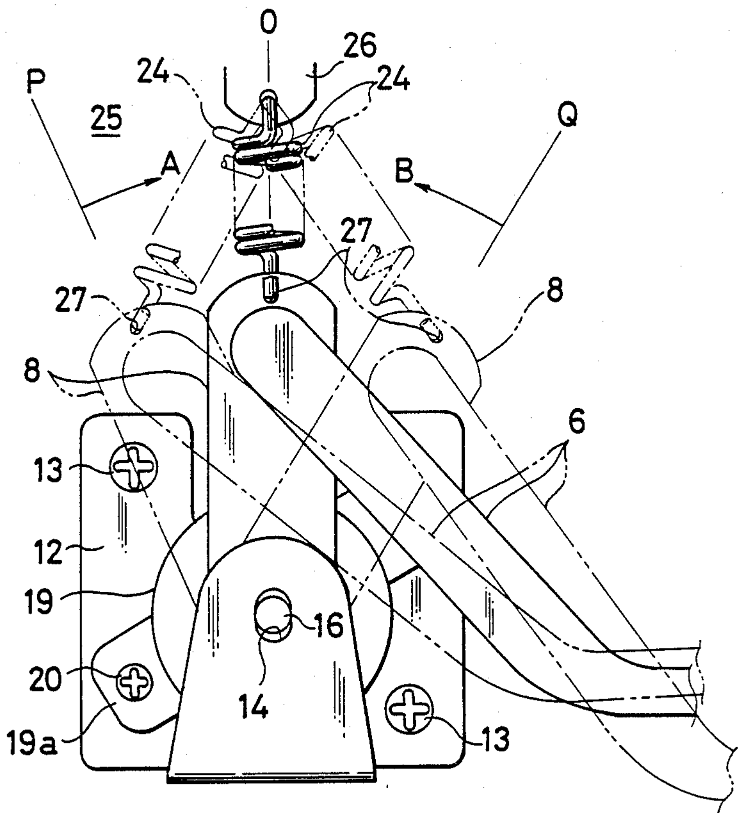
FIG. 4 is a side view showing another embodiment of a damper device of the present invention.

FIG. 4 illustrates a second embodiment constructed according to the present invention and corresponding to the structure of FIG. 2. Like parts corresponding to those of the first embodiment are denoted by like reference numerals and a detailed description thereof is therefore omitted.

In this second embodiment, a single tension coil spring 24 is employed instead of the two torsion coil springs 22 and 23. One end of the tension coil spring 24 is pivotably secured to an engaging portion 26 mounted upon the wall surface 25, whereas the other end thereof is mounted within a retaining hole 27 defined within the arm 8. The remaining structure thereof is the same as that of the first embodiment.

When the door 3 is near the totally shut position, the arm 8 is disposed at the position P as shown in FIG. 4 and is biased by means of the tension coil spring 24 in the opening direction, that is, the direction shown by the arrow "A". And, when the door 3 is swung in the opening direction to some extent and brought to a position at which the arm 8 is disposed at the position denoted O where a force is applied to the door 3 in the opening direction by means of its own weight, the coil spring 24 is also pivoted so as to bias the arm 8 in the closing direction, that is, the direction shown by the arrow "B". As a result, even if the resistance of the damper 19 is small relative to the motion of the door 3, the door 3 is smoothly brought to the open position by means of the action of the coil spring 24.

According to this second embodiment, since only one tension coil spring need be employed as the spring means instead of two torsion coil springs, the number of component parts can be reduced. The function and effect thereof are the same as in the first embodiment.

Needless to say, the present invention is not limited to the above-mentioned embodiments and can be applied to many other devices. For example, although a torsion coil spring and a tension coil spring are employed as spring means for biasing the door, a plate spring, or the like, may likewise be employed. Alternatively, the door may be directly biased by spring means without an arm and a damper may be directly provided upon the rotary shaft of the door.

Furthermore, although the door is biased both in the opening and closing directions by means of a spring, the totally shut position of the door may be established such that the door can be opened without passing through a substantially vertical plane; that is, the door can be swung in the opening direction by under the influence of its own weight as soon as it leaves the stopper, and the door may be biased only in the closing direction by means of a spring. Moreover, as damper means, one employing frictional resistance or inertial force may be employed instead of one employing the viscous resistance of an oil or the like.

As is apparent from the foregoing description, according to the present invention, a damper device for a door can be made small in size and the service life thereof can be prolonged merely by using a small-sized damper and spring means. In addition, the outer appearance of the door is improved. The present invention thus provides significantly improved technical effects.

Obviously, many modifications and variations of the present invention are possible in light of the above teachings. It is therefore to be understood that within the scope of the appended claims, the present invention may be practiced otherwise than as specifically described herein.

What is claimed is:

1. A damper system for a door means which is movable between a closed position and an open position, and which passes through an intermediate position defined between said open and closed positions wherein said door means is opened under the influence of its own weight, during movement from said closed position to said open position, at least from said intermediate position to said open position, comprising:

damping means operatively connected to said door means for damping movement of said door means in either direction between said open and closed positions; and spring means operatively connected to said door means for biasing said door means toward said closed position when said door means is disposed at a position between said intermediate position and said open position, and for biasing said door means toward said open position when said door means is disposed at a position between said intermediate position and said closed position.

2. A damper system as claimed in claim 1, wherein: said spring means comprises a first spring means for biasing said door means toward said open position until said door means reaches said intermediate position when said door means is moving toward said open position from said closed position, and a second spring means for biasing said door means toward said closed position until said door means reaches said intermediate position when said door means is moving toward said closed position from said open position.

3. A damper system as set forth in claim 2, wherein: said first and second spring means comprise torsion springs, 4. A damper system as set forth in claim 2, further comprising:

a shaft pivotably connected to said damping means and having said spring means mounted thereon;

an actuating arm fixedly connected to said shaft; and actuating rod means, pivotably connected at one end thereof to said actuating arm, and pivotably connected at another end thereof to said door means, for transmitting said biasing forces of said spring means, and said movements of said door means, between said actuating arm and said door means.

5. A damper system as set forth in claim 4, wherein: said shaft has an axially stepped configuration comprising a first large diameter portion upon which said first spring means is mounted, and a second, relatively smaller diameter portion upon which said second spring means is mounted.

6. A damper system as set forth in claim 5, wherein: said first and second spring means comprise torsion coil springs coiled about said first and second diameter portions of said shaft, respectively.

7. A damper system as set forth in claim 4, further comprising:

housing means for mounting said shaft and said actuating arm fixedly connected to said shaft;

one end of said first spring means is engaged with said actuating arm, and another end of said first spring means is engaged with one side edge portion of said housing means; and one end of said second spring means is engaged with said actuating arm, and another end of said second spring means is engaged with an opposite side edge portion of said housing means.

8. A damper system as set forth in claim 7, wherein: said actuating arm has a substantially L-shaped configuration when viewed in horizontal cross-section;

said one end of said first spring means is operatively engaged with a first leg portion of said substantially L-shaped actuating arm; and said one end of said second spring means is operatively engaged with a second leg portion of said substantially L-shaped actuating arm.

9. A damper system as set forth in claim 1, wherein: said spring means comprises a single spring means which is movable between a first position at which said spring means biases said door means toward said closed position when said door means is disposed at a position between said intermediate position and said open position, and a second position at which said spring means biases said door means toward said open position when said door means is disposed at a position between said intermediate position and said closed position.

10. A damper system as set forth in claim 9, wherein: said single spring means is pivotably mounted upon a support structure, upon which said door means is movably mounted, between said first and second positions.

11. A damper system as set forth in claim 10, further comprising:

a shaft pivotably connected to said damping means;

an actuating arm fixedly connected to said shaft;

one end of said single spring means being connected to said support structure while another end of said single spring means is connected to said actuating arm; and actuating rod means, pivotably connected at one end thereof to said actuating arm, and pivotably connected at another end thereof to said door means, for transmitting said biasing forces of said spring means, and said movements of said door means, between said actuating arm and said door means.

12. A damper system as set forth in claim 9, wherein: said single spring means comprises a tension coil spring.

13. A damper system as set forth in claim 1, wherein: said damping means comprises an oil-type damping means.

14. A damper system as set forth in claim 1, wherein: said damping means comprises a frictional-resistance type damping means.

15. A damper system as set forth in claim 1, wherein: said damping means comprises an inertial-type damping means.

* * * * *